United States Patent [19]

Madonia et al.

[11] 4,296,155
[45] Oct. 20, 1981

[54] OVERCOATED DECORATIVE MOULDING

[76] Inventors: Ciro N. Madonia, 1390 Beaufort Dr., Burlington, Ontario; Christopher Hatzikelis, R.R. 1, Palgrave, Ontario; Cesare C. Cosentino, 45 Grandview Ave., Thornhill, Ontario, all of Canada

[21] Appl. No.: 85,276

[22] Filed: Oct. 16, 1979

[51] Int. Cl.³ .................. B32B 3/02; B32B 31/30
[52] U.S. Cl. .................................. 428/31; 52/716; 293/1; 428/463
[58] Field of Search ............... 428/31, 463; 52/716; 293/1

[56] References Cited
U.S. PATENT DOCUMENTS 3,156,580 11/1964 Howard .................... 428/418 X
3,745,056 7/1973 Jackson .................... 428/31 X
3,811,989 5/1974 Hearn ..................... 428/31 X
3,989,609 11/1976 Brack ..................... 428/458 X
4,164,459 8/1979 Noomen et al. ............ 428/463 X

FOREIGN PATENT DOCUMENTS 929984 7/1973 Canada ..................... 428/31

Primary Examiner—Henry F. Epstein

[57] ABSTRACT

Decorative extruded vinyl mouldings for protecting auto bodies commonly have a metallized strip of chrome-like appearance laminated to the exposed impact-absorbing surface of the moulding. During prolonged exposure to weathering, the metallized strip becomes dull and unattractive. In this invention, a liquid acrylic coating is applied over the entirety of the metallized strip and cured by utlra-violet radiation at the extrusion speed of the vinyl moulding.

6 Claims, 5 Drawing Figures

OVERCOATED DECORATIVE MOULDING

BACKGROUND OF THE INVENTION

The present invention relates to elongated decorative mouldings, for protecting the bodies of land and water vehicles and the like from damage caused by minor impacts. In particular, the invention relates to mouldings of this type which comprise an extruded strip having a decorative strip attached thereto and carrying adhesive means for fastening the moulding to a vehicle body.

Such mouldings have enjoyed increasing popularity since about 1965 among auto body customizers and the automobile-buying public. The growth in popularity of these mouldings was not only because of their decorative qualities but also because they significantly lessen the paint chipping and minor dents inflicted in parking lots by the careless opening of adjacent car doors. More recently, automobile manufacturers such as the Ford Motor Company have been installing such mouldings on their new vehicles for the above reasons and because they did not require fasteners as did the chromed metallic moulding strips which had previously been used on new cars.

In their most popular form, such mouldings are formed by laminating a decorative strip of thin material (for example vinyl or polyvinyl chloride material) to the impact-absorbing surface of a thicker extruded strip of, for example, vinyl or polyvinyl chloride material. The exposed outer surface is typically coated with a metallic material such as aluminum in order to present an attractive chrome-like appearance to the decorative strip. Because the metallic material is susceptible to discolouration due to weathering, it is common to use decorative strips which have a protective polyester film applied over the metallized surface.

In practice, such decorative strips are formed by first metallizing a wide, thin sheet of, for example, polyvinyl chloride material, laminating it with a wide polyester film, and then slitting the metallized, polyester film covered sheet into narrow decorative strips. Unfortunately, slitting causes slight delamination of the polyester film from the metallized surface along the edges of the decorative strips. This "slitting delamination" later permits weathering and discolouration of the metallic decorative material after the decorative strip has been attached to the thick extruded strip to form the finished moulding and the later has been attached by a adhesive to a car body. It is believed that this discolouration is caused by the progressive action oxidation, salt and other corrosive elements of the atmosphere which begin at the edges of the decorative strip and gradually corrode most of the aluminum or other metallic material between the polyester film and the polyvinyl chloride strip. As a result, the decorative strip typically becomes dull and discoloured within about one year after the moulding has been applied to the vehicle body. Such discolouration is very undesirable and gives rise to numerous consumer complaints.

Previous attempts at overcoming this problem have met with little success. The most common approach has been to bury the edges of the decorative strip into the thick extruded strip in order to prevent their exposure to weathering. Unfortunately, this solution is complex, is unsuited to many popular decorative moulding designs, and may even cause delamination of the protective polyester film by the migration of plasticizer compounds from the thick extruded strip into the adhesive used to attach the polyester film over the metallized decorative strip.

Accordingly, it is the principal object of the invention to provide an elongated decorative moulding which is highly resistant to weathering and the attendant discolouration of the metallized or otherwise decorative strips carried by the moulding.

It is a further object to provide a weather-resistant moulding which obviates the need to use expensive decorative strips which have a highly weather-resistant polyester film laminated thereto.

It is a further object to render the moulding weather resistant while permitting production thereof to be carried out with safety at the extrusion rate of the thick extruded strip.

SUMMARY OF THE INVENTION

To achieve the foregoing and other unstated objects and advantages, the present invention provides an elongated decorative moulding for protecting vehicle bodies from minor impacts, said decorative moulding comprising:

(a) an extruded strip of pliable material having a first surface and an impact-absorbing second surface spanning said first surface;

(b) adhesive means carried by said first surface and adapted to fasten said first surface to a vehicle body;

(c) a decorative strip having two major surfaces and two minor edge surfaces, one major surface being attached to said impact-absorbing second surface, the other major surface having a decorative material thereon, said decorative material being susceptible to weathering at least at the edge surfaces of said decorative strip; and (d) a transparent weather-resistant coating covering at least the edge surfaces and the portion of said decorative strip immediately adjacent each edge surface thereof and the portion of said extruded strip immediately adjacent said decorative strip.

According to a preferred embodiment of the invention, the decorative moulding comprises;

(a) an extruded strip of pliable material having a first substantially flat surface and an impact-absorbing second surface spanning said first surface;

(b) adhesive means carried by said first surface and adapted to fasten said first surface to a vehicle body;

(c) a decorative strip having two major surfaces and two minor edge surfaces, one major surface being attached to said impact-absorbing second surface of said extruded strip, the other major surface having a decorative material thereon, said decorative material being susceptible to weathering; and (d) a transparent weather-resistant coating covering said decorative strip and at least the portion of said impactabsorbing second surface immediately adjacent each edge surface of said decorative strip.

Preferably, the weather-resistant coating comprises an acrylic material which covers the decorative strip and the impact-absorbing second surface. For safety and to achieve rapid curing, the weather-resistant coating is formed by applying a liquid which comprises acrylic monomers and then curing the liquid by brief exposure to ultra-violet radiation.

INTRODUCTION TO THE DRAWINGS

For a better understanding of the invention and its advantages, reference may be made to the following detailed description, taken in conjunction with the appended drawings, wherein.

DETAILED DESCRIPTION

Figure 1:
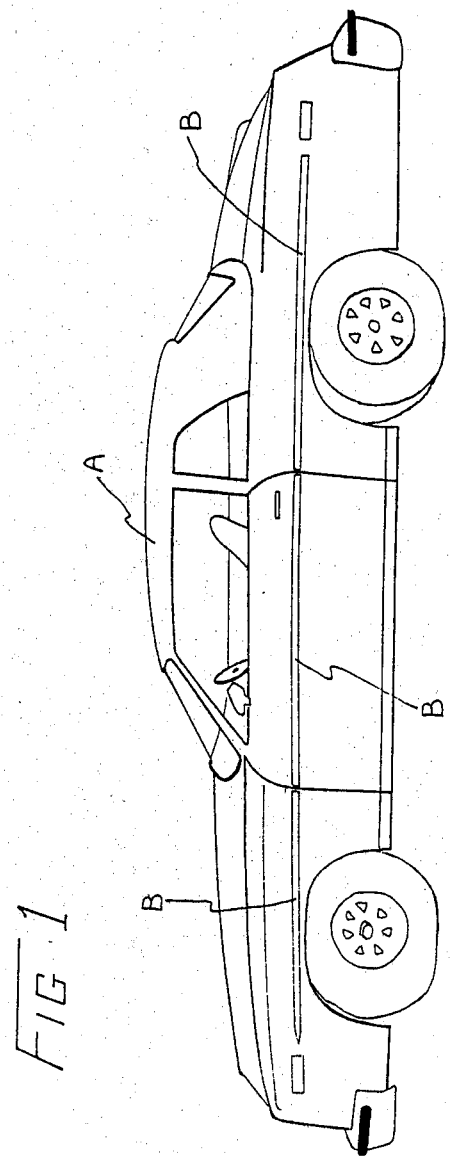
FIG. 1 is an elevational view of a vehicle having the novel decorative moulding applied to the body thereof.

Throughout the figures of the drawings, like reference characters have been used to indicate corresponding parts of the decorative moulding embodiments illustrated therein.

FIG. 1 shows a vehicle A to the body of which a decorative moulding B has been applied as protection against minor impacts causing dents and chipping of paint. Mouldings of this kind are also used on the bodies of trucks, trailers, boats, and other vehicles.

Figure 2:
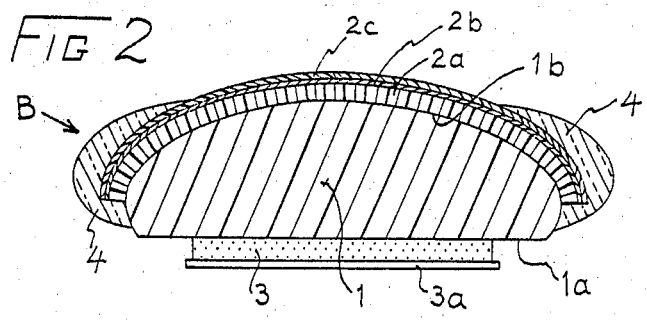
FIG. 2 is a lateral cross-sectional view of a decorative moulding in accordance with one embodiment of the invention.

FIG. 2 shows a lateral cross-section of one embodiment of the novel decorative moulding. As shown, the moulding comprises a thick extruded strip 1 of vinyl, polyvinyl chloride, or other material which is sufficiently pliable to conform to the gradually curved surfaces of a vehicle body. Extruded strip 1 has a first surface 1a, which is preferably substantially flat, and an impact-absorbing second surface 1b. Adhesive means, shown as a layer 3 of pressure-sensitive adhesive covered by a strip 3a of protective wax paper or other non-adherent material, is carried by first surface 1a. After stripping away strip 3a, the exposed adhesive layer 3 is used to fasten first surface 1a in the position illustrated for moulding B in FIG. 1.

A decorative strip 2a of thin vinyl, polyvinyl chloride, or other material has two major surfaces and two minor edge surfaces extending the length of decorative strip 2a. The lower, or inner, major surface of decorative strip 2a is attached to the impact-absorbing second surface 1b of extruded strip 1, as by adhesives or by pressure-lamination. The outer major surface of decorative strip 2a has a layer 2b of decorative material thereon which may, for example, be a metallic material such as aluminum. In any event, the decorative material of layer 2b is susceptible to weathering as discussed hereinbefore. To reduce discolouration of layer 2b due to weathering, it is covered with a polyester film 2c. To this point this description of FIG. 2 has been concerned only with prior art features of the moulding cross-section shown therein. In particular, decorative material 2b is uncovered by polyester film 2c, and is therefore susceptible to weathering, at least at the edge surfaces of decorative strip 2a. During prolonged outdoor exposure, the entire layer 2b commonly becomes discoloured and dull because its edges are exposed to weathering.

To overcome this problem a transparent weather-resistant coating 4 is formed to cover the edge surfaces of decorative strip 2a and the portions of decorative strip 2a (or, more specifically, of its protective polyester film 2c) and of surface 1a of extruded strip 1 which are immediately adjacent the aforementioned edge surfaces, Preferably, the coating 4 shown in FIG. 2 is formed by applying a liquid which comprises acrylic monomers and then curing or polymerizing this liquid coating by exposing it to ultraviolet radiation.

It has been found particularly advantageous to use, as the liquid acrylic coating material, the high energy cure coating resin manufactured by Hughson Chemicals Inc. of Erie, Pennsylvania under their product designation RD-3419-60, This liquid acrylic material may be applied by a squeegee roller or the like to the moulding 1 as the latter is extruded (and after decorative strip 2a, layer 2b, and film 2c are bonded to molding 1) at speeds of the order of 90 feet per minute. Moreover, and advantageously, this RD-3419-60 material is a high energy cure coating resin which can be cured very rapidly and with little risk of fire by exposing it briefly to ultraviolet radiation. Thus, the liquid-coated moulding may be conveyed at extrusion speed (e.g. 90 feet/minute) through a chamber irradiated by ultraviolet lamps of preferably high intensity; upon passing through this chamber, the liquid coating will have been cured into a hard acrylic protective coating and the overcoated moulding will be ready for packaging and marketing.

Figure 3:
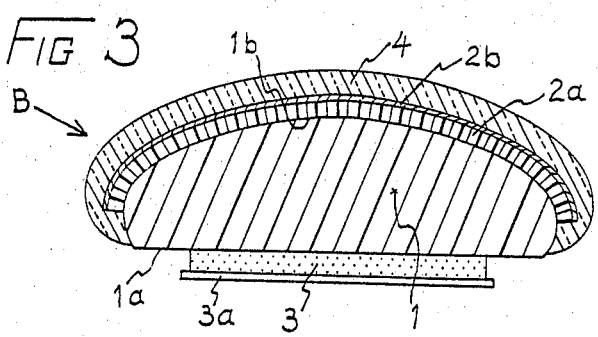
FIG. 3 is a lateral cross-sectional view of a decorative moulding in accordance with a second embodiment of the invention.
Figure 4:
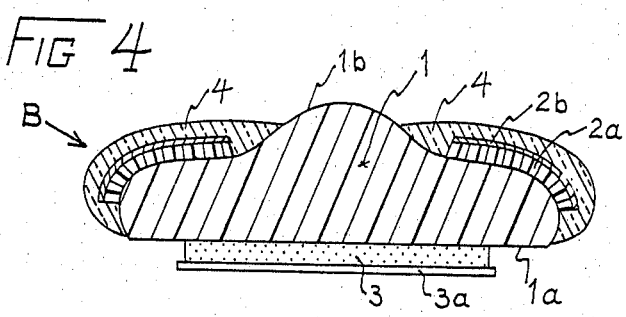
FIG. 4 is a lateral cross-sectional view of a decorative moulding in accordance with a third embodiment of the invention.
Figure 5:
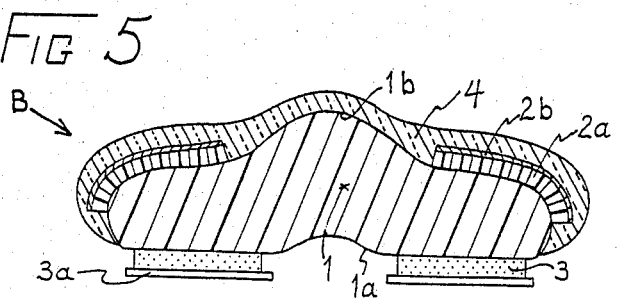
FIG. 5 is a lateral cross-sectional view of a decorative moulding in accordance with a fourth embodiment of the invention.

FIGS. 3, 4, and 5 each each show the use of a protective coating 4 on mouldings to which has been applied a decorative strip 2a which has no protective polyester film 2c (as was present in FIG. 2). For this reason, coating 4 covers the entire decorative strip 2a (including its decorative layer 2b) and at least the portion of the impact-absorbing second surface 1b which is immediately adjacent to each edge surface of decorative strip 2a.

FIG. 4 illustrates a moulding provided with a decorative strip along each side of surface 1b, with coating 4 extending for only a short distance beyond decorative strips 2a onto surface 1b. In FIG. 5, coating 4 has been applied over decorative strips 2a and over the entire portion of surface 1b disposed between them.

In acid bath tests, it has been found that prior art mouldings (protected only by polyester film 2c) had their metallic layers 2b disintegrate in several minutes. By contrast, mouldings (as shown in FIGS. 3 and 5) overcoated with only a 0.001 inch thick acrylic coating were found to maintain a bright metallic appearance of their decorative metallic layers 2b for several hours after immersion into the same acid bath. Extrapolation of these results to the much less corrosive atmosphere encountered outdoors by vehicle bodies indicates that the overcoated mouldings of this invention may well maintain a bright appearance for the life of the vehicle to which they are applied.

The invention has been described with reference to the preferred embodiments shown in the drawings. Obvious modifications and changes will suggest themselves to those having ordinary skill, and it is intended that these modifications and changes be encompassed by the invention insofar as they come within the scope of the appended claims.

What is claimed is:

1. An elongated decorative moulding for protecting vehicle bodies from minor impacts, said decorative moulding comprising:

(a) an extruded strip of pliable material having a symmetrical lens shaped cross section with substantially flat first surface and an impact-absorbing outwardly convex second-surface spanning said first surface;
(b) adhesive means carried by said first surface and adapted to fasten said first surface to a vehicle body;
(c) a decorative strip having two major surfaces and two minor edge surfaces, one major surface being attached to said impact-absorbing second surface, the other major surface having a decorative material thereon, said decorative material being susceptible to weathering at least at the edge surfaces of said decorative strip; and
(d) a transparent weather-resistant acrylic monomer coating overlying at least the edge surfaces and the portion of said decorative strip immediately adjacent each edge surface thereof in sealing relation therewith and connected in sealing relation with the portion of said extruded strip immediately adjacent said decorative strip.

2. A moulding as set forth in claim 1, said pliable material being a polyvinyl chloride material, said decorative material being aluminum, and said weather-resistant coating covering said decorative strip and at least the portion of said extruded strip immediately adjacent said decorative strip.

3. A moulding as set forth in claim 1, said extruded strip and said decorative strip being each composed of a polyvinyl chloride material, said decorative strip being laminated to said impact-absorbing second surface, said weather-resistant coating covering said decorative strip and said second surface.

4. An elongated decorative moulding for protecting vehicle bodies from minor impacts, said decorative moulding comprising:
(a) an extruded strip of pliable material having a symmetrical lens-shaped cross section with a substantially flat first surface and an impact-absorbing outwardly convex second surface spanning said first surface;
(b) adhesive means carried by said first surface and adapted to fasten said first surface to a vehicle body;
(c) a decorative strip having two major surfaces and two minor edge surfaces, one major surface being attached to said impact-absorbing second surface of said extruded strip, the other major surface having a decorative material thereon, said decorative material being susceptible to weathering; and
(d) a transparent weather-resistant coating comprising an acrylic monomer covering said decorative strip and extending in sealing relation with at least the portion of said impact-absorbing second surface immediately adjacent each edge surface of said decorative strip.

5. A moulding as set forth in claim 4, said pliable material being a polyvinyl chloride material, said decorative material being aluminum, and said weather-resistant coating covering said decorative strip and said impact-absorbing second surface.

6. A moulding as set forth in claim 4, said extruded strip and said decorative strip being each composed of a polyvinyl chloride material, said decorative strip being laminated to the second surface of said extruded strip, said weather-resistant coating covering said decorative strip and said second surface.

* * * * *